United States Patent
Shiohara et al.

(10) Patent No.: US 7,710,494 B2
(45) Date of Patent: May 4, 2010

(54) DIGITAL CAMERA HAVING A SHUTTER CURTAIN AND EXPOSURE CONTROL METHOD THEREOF

(75) Inventors: Ryuichi Shiohara, Nagano (JP); Ryohei Ito, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 603 days.

(21) Appl. No.: 11/454,683

(22) Filed: Jun. 15, 2006

(65) Prior Publication Data
US 2007/0019079 A1    Jan. 25, 2007

(30) Foreign Application Priority Data
Jun. 15, 2005   (JP)   ............... P2005-175016
Jun. 24, 2005   (JP)   ............... P2005-185113

(51) Int. Cl.
H04N 5/235   (2006.01)
G03B 7/00    (2006.01)

(52) U.S. Cl. ............ 348/362; 348/220.1; 348/221.1; 348/333.01

(58) Field of Classification Search ............. 348/294, 348/296, 297, 302–305, 333.01, 362, 363, 348/366, 220.1, 221.1
See application file for complete search history.

(56) References Cited

U.S. PATENT DOCUMENTS 4,164,368 A * 8/1979 Miyata ............... 396/273
5,323,205 A * 6/1994 Matsubara et al. ........ 396/488
5,335,075 A * 8/1994 Komiya et al. ........... 348/298
5,978,610 A * 11/1999 Aoki .................... 396/429
6,870,691 B2 * 3/2005 Konno ................... 359/738
7,388,607 B2 * 6/2008 Nakahira ............. 348/240.2
2001/0005231 A1   6/2001 Kubo
2001/0010554 A1 * 8/2001 Yoshida ................ 348/312
2003/0030737 A1 * 2/2003 Yanai ................... 348/296
2004/0046881 A1   3/2004 Utagawa
2005/0013605 A1   1/2005 Kubo

FOREIGN PATENT DOCUMENTS

| JP | 61212835 A | 9/1986 |
| JP | 08-018875 | 1/1996 |
| JP | 2000089334 A | 3/2000 |
| JP | 2000-236486 | 8/2000 |
| JP | 2005045544 A | 2/2005 |

OTHER PUBLICATIONS

European Search Report dated Oct. 19, 2006 (re: EP06253113).

* cited by examiner

Primary Examiner—Gevell Selby
(74) Attorney, Agent, or Firm—Nutter McClennan & Fish LLP; John J. Penny, Jr.; Rory P. Pheiffer

(57) ABSTRACT

A control method of a digital camera includes: displaying a moving image on a screen based on charges stored in an image sensor by an electronic shutter with a shutter curtain opened; detecting illuminance of the shutter curtain with the shutter curtain closed; setting a still image exposure period based on the detected illuminance of the shutter curtain; exposing the image sensor in the still image exposure period with the shutter curtain opened; and storing a still image in a recording medium based on the charges stored in the image sensor in the still image exposure period.

20 Claims, 12 Drawing Sheets

DIGITAL CAMERA HAVING A SHUTTER CURTAIN AND EXPOSURE CONTROL METHOD THEREOF

BACKGROUND OF THE INVENTION

The present invention relates to a digital camera and a control method thereof and more specifically, to a digital camera using a shutter curtain which operates mechanically and using an area image sensor which does not have a structure for a high-speed draft mode, and a control method thereof.

A CCD area image sensor which divides electric charges stored in photodiodes into charges of a plurality of divided fields to transfer them is known (refer to, for example, JP-A-8-18875 and Japanese Patent No. 3009041). By dividing electric charges stored in photodiodes into charges of a plurality of divided fields to transfer them, the area of the vertical CCD can be reduced. As a result, since the area of the photodiodes can be increased, this becomes advantageous from the viewpoint of the saturated amount of signals. A digital camera provided with an electronic viewfinder is often mounted with an area image sensor corresponding to a high-speed draft mode, with a function of selectively reading charges at regular intervals from a plurality of photodiodes, which are arrayed along the vertical CCD, in order to increase the frame rate of a moving image which is displayed in real time on the electronic viewfinder. Since the area image sensor corresponding to a high-speed draft mode is provided with a dedicated control signal line for reading the charges stored in the photodiodes at one time by thinning out them according to a rule capable of forming a color image, pixels in a vertical direction from all pixels can be thinned out and read out. As a result, since a grainy image representing a whole image, that is, an image having a low resolution can be read, the frame rate of a moving image can be increased by reading the grainy image in a short time.

However, since a digital camera provided with a high-resolution CCD image sensor which is not corresponding to the high-speed draft mode cannot increase the frame rate of a moving image, it has a difficulty in realizing a moving image display function by the electronic viewfinder. In a digital camera provided with a high-sensitivity and high-resolution CCD image sensor, exposure is often by a shutter curtain which operates mechanically.

SUMMARY

It is therefore an object of the invention to provide a digital camera and its control method capable of controlling exposure of a still image by a shutter curtain which operates mechanically to display a moving image in real time and capable of increasing the frame rate of a moving image, even if an area image sensor does not have a structure for a high-speed draft mode.

In order to achieve the object, according to the invention, there is provided a control method of a digital camera comprising:

displaying a moving image on a screen based on charges stored in an image sensor by an electronic shutter with a shutter curtain opened;

detecting illuminance of the shutter curtain with the shutter curtain closed;

setting a still image exposure period based on the detected illuminance of the shutter curtain;

exposing the image sensor in the still image exposure period with the shutter curtain opened; and storing a still image in a recording medium based on the charges stored in the image sensor in the still image exposure period.

With this configuration, by storing the charges in the image sensor by the electronic shutter with the shutter curtain opened, the moving image can be displayed in real time on the screen on the basis of the charges stored in the image sensor. By setting the still image exposure period on the basis of the detected illuminance of the shutter curtain in its closed state, and opening the shutter curtain in the still image exposure period, exposure of a still image can be controlled by the mechanical shutter curtain.

The displaying process may include: storing the charges in photodiodes of the image sensor; transferring the charges, which belong to a plurality of fields being different from each other and constituting one frame, from the photodiodes to a vertical element of the image sensor in time-division manner; transferring the charges in every field from the vertical element to a horizontal element of the image sensor; transferring the charges in every field from the horizontal element to a detecting element of the image sensor; generating pixel signals corresponding to the charges transferred to the detecting element in every field; and generating a plurality of continuous frames based on each pixel signal while displaying each frame as the moving image.

In this case, by using the pixel signals of one field for generation of pixel signals of a plurality of continuous frames, and by overlapping the pixel signals of one field with a plurality of frames, even if the image sensor does not have a structure for a high-speed draft mode, the frame rate of the moving image of a digital camera can be increased.

The charges in a plurality of cells of the vertical element may be transferred to and accumulated in each of cells of the horizontal element.

In this case, by accumulating the charges for a plurality of cells of the vertical element in each cell of the horizontal element and transferring charges of each cell of the horizontal element to the detecting element, the number of times of transfer of charges by the vertical element can be reduced. As a result, the frame rate of a moving rate of a digital camera can be increased.

The displaying process may include: storing the charges in photodiodes of the image sensor; transferring the charges, which belong to a plurality of fields being different from each other and constituting one frame, from the photodiodes to a vertical element of the image sensor in time-division manner; transferring the charges in every field from the vertical element to a horizontal element of the image sensor; transferring the charges in every field from the horizontal element to a detecting element of the image sensor; generating pixel signals corresponding to the charges transferred to the detecting element in every field; and generating each frame based on each pixel signal while displaying each frame as the moving image.

In this case, a frame of a monotone image can be generated on the basis of the charges of photodiodes corresponding to some color components of all the color components. Accordingly, even if a digital camera is not provided with dedicated signal lines for a high-speed draft mode, the frame rate can be increased by transmitting, to control signal lines for detecting time-divided charges of photodiodes in every field, control signals for detecting charges of the photodiodes for one field in every frame, and displaying each frame of a monotone moving image on the screen on the basis of the charges of the photodiodes for one field.

The charges in a plurality of cells of the vertical element may be transferred to and accumulated in each of cells of the horizontal element.

In order to achieve the object, according to the invention, there is also provided a digital camera comprising:

an image sensor;

a shutter curtain, adapted to expose and shield the image sensor;

a display controller, operable to display a moving image on a screen based on charges stored in the image sensor by an electronic shutter with the shutter curtain opened; and a still image recorder, operable to detect illuminance of the shutter curtain with the shutter curtain closed, to set a still image exposure-period based on the illuminance, to expose the image sensor in the still image exposure period with the shutter curtain opened, and to store a still image in a recording medium based on the charges stored in the image sensor in the still image exposure period.

The image sensor may include a first controller, operable: to store the charges in photodiodes of the image sensor; to transfer the charges, which belong to a plurality of fields being different from each other and constituting one frame, from the photodiodes to a vertical element of the image sensor in time-division manner; to transfer the charges in every field from the vertical element to a horizontal element of the image sensor; and to transfer the charges in every field from the horizontal element to a detecting element of the image sensor. The display controller may include a second controller, operable: to generate pixel signals corresponding to the charges transferred to the detecting element in every field; to generate a plurality of continuous frames based on each pixel signal; and to display each frame as the moving image.

The charges in a plurality of cells of the vertical element may be transferred to and accumulated in each of cells of the horizontal element.

The image sensor may include a first controller, operable: to store the charges in photodiodes of the image sensor, to transfer the charges, which belong to a plurality of fields being different from each other and constituting one frame, from the photodiodes to a vertical element of the image sensor in time-division manner; to transfer the charges in every field from the vertical element to a horizontal element of the image sensor; and to transfer the charges in every field from the horizontal element to a detecting element of the image sensor. The display controller may include a second controller, operable: to generate pixel signals corresponding to the charges transferred to the detecting element in every field; to generate each frame based on each pixel signal; and to display each frame as the moving image.

The charges in a plurality of cells of the vertical element are transferred to and accumulated in each of cells of the horizontal element In addition, the order of respective operations of the method as set forth in claims is not limited to the described order unless there are technical impediments. For example, the operations may be executed in an arbitrary order or may be executed at the same time. Further, the respective functions of a plurality of units installed in the present invention are implemented by hardware resources whose functions are specified by their own construction, software resources whose functions are specified by programs, or combinations of the hardware and software resources. Further, the respective functions of the plurality of units are not limited to those which are implemented by software resources physically independent from each other. Further, the present invention can be specified not only as an invention of a program but also as an invention of a recording medium in which the program is recorded.

DETAIL DESCRIPTION OF PREFERRED EMBODIMENTS

Figure 1A:
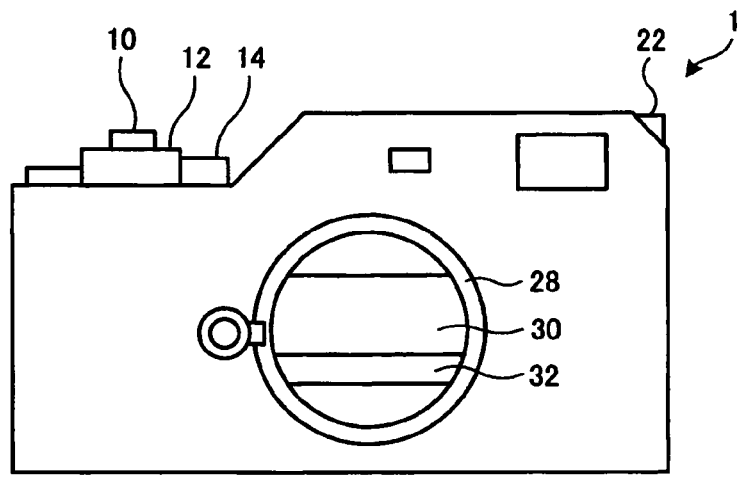
FIGS. 1A to 1C are views showing the appearance of a digital still camera according to a first embodiment.
Figure 1B:
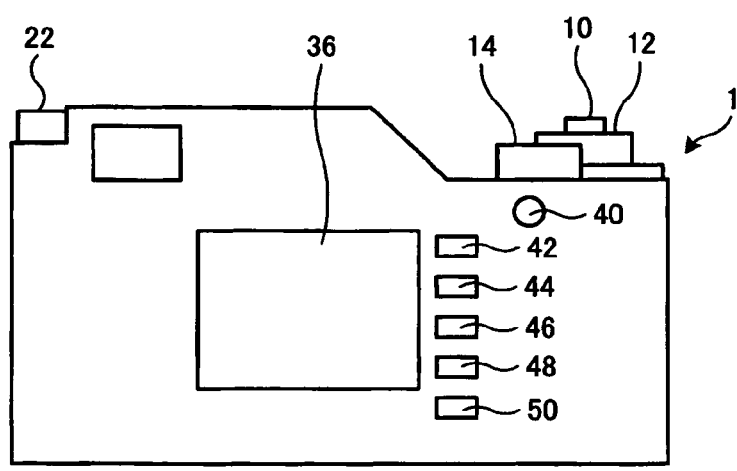
Figure 1C:
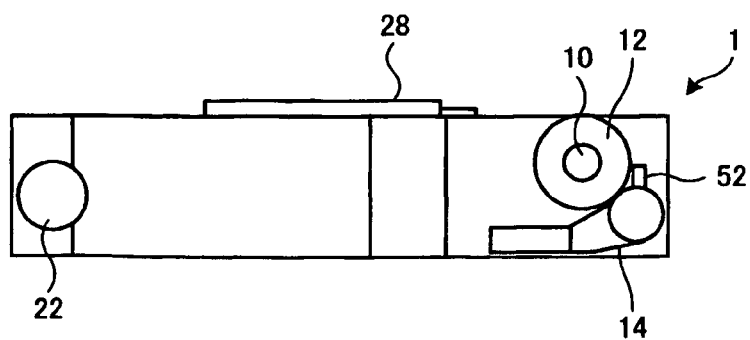

Hereinafter, a plurality of embodiments of the invention will be described with reference to the accompanying drawings. The components of each embodiment to which the same reference numerals are given correspond to those of other embodiments to which the reference numerals are given.

First Embodiment

Figure 2A:
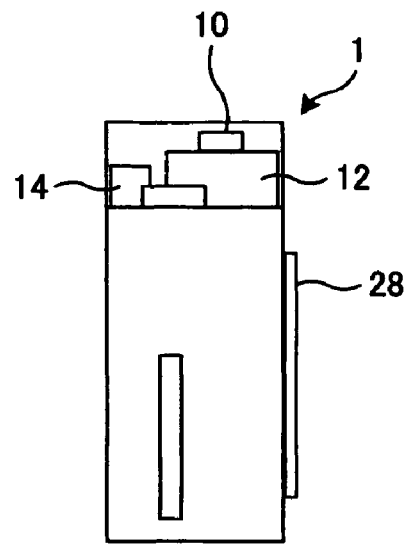
FIGS. 2A and 2B are views showing the appearance of the digital still camera according to the first embodiment.
Figure 2B:
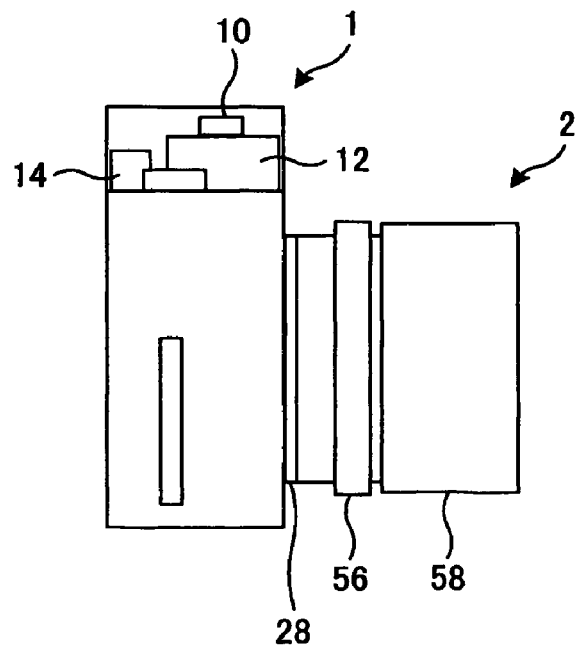
Figure 3:
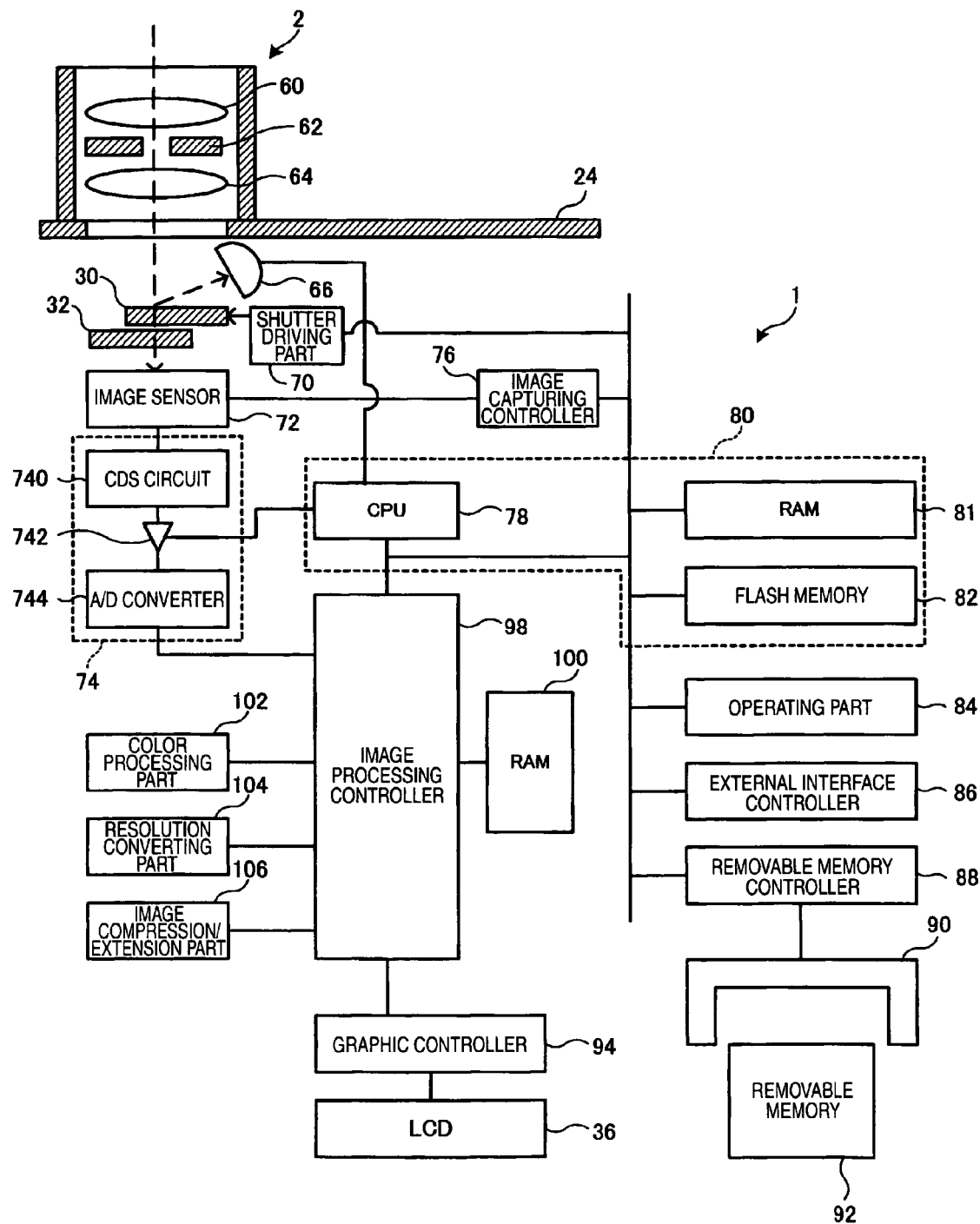
FIG. 3 is a block diagram of the digital still camera according to the first embodiment.

FIGS. 1A, 1B, 1C and 2A are views showing the appearance of a digital still camera (DSC) 1 according to a first embodiment of the invention. FIG. 2B is a view showing that a replaceable lens unit 2 is mounted to the DSC 1. FIG. 3 is a block diagram showing the DSC 1.

In addition, although the DSC 1 is of a compact camera type, it may be of a single lens reflex camera type.

In the DSC 1, a plurality of kinds of replaceable lens units 2 can be mounted to a mount 28. A focus adjusting dial 58 and a diaphragm adjusting dial 56 are provided outside a lens barrel of each lens unit 2. When the focus adjusting dial 58 rotates, lenses 60 and 64 move in the direction of an optical axis. A focus can be adjusted by rotating the focus adjusting dial 58. When the diaphragm adjusting dial 56 rotates, the aperture of a diaphragm 62 varies. The diaphragm can be adjusted by rotating the diaphragm adjusting dial 56.

A first shutter curtain 30 and a second shutter curtain 32 constitute an electrically controlled focal plane shutter. The first shutter curtain 30 and the second shutter curtain 32 are put into an operable state by rotating a winding lever 14, and their mechanical opening and shutoff operations are electrically controlled by a shutter driving part 70. That is, when the shutter starts to operate, the first shutter curtain 30 operates first, and shutoff of the light projected through the lenses within the replaceable lens unit 2 is opened. Therefore, exposure of the image sensor 72 starts, and this exposure is continued during the period until the second shutter curtain 32 operates. Then, since the light projected through the lenses with the completion of the operation of the second shutter curtain 32 is shut off again, the exposure is completed.

In addition, the construction of the shutter is not limited particularly. For example, the shutter may be a shutter in which electric control is not used for operation of a shutter curtain or may be a shutter in which the charge storage time of the image sensor 72 is controlled by a so-called electronic shutter which controls a substrate voltage, without using the shutter curtain.

The internal illuminance meter 66 is an optical sensor which measures the illuminance of the reflected light of the shutter curtain. The illuminance of the light which is incident on the internal illuminance meter 66 varies according to the aperture of the diaphragm 62. Therefore, if the diaphragm adjusting dial 56 rotates, the output value of the internal illuminance meter 66 also varies. The quantity of the light projected through the lenses within the replaceable lens unit 2 can be measured according to the output of the internal illuminance meter 66 which measures the illuminance of the reflected light of the shutter curtain. The result of this measurement is used for calculation of shutter speed, that is, an exposure period or the like of the image sensor 72 by the DSC 1.

It is noted herein that the surface of the shutter curtain in a photographing preparatory state is not painted in plain deep black or pure white, but is painted so that its refractive index becomes about 18%. As a result, the illuminance of the light projected through the tens unit 2 can be more exactly measured by the internal illuminance meter 66. Further, if the intense reflected light is incident on the shutter curtain, the internal illuminance meter 66 cannot measure the illuminance of the reflected light exactly. In this case, since a proper exposure period cannot be calculated, photographing with proper exposure cannot be performed. Thus, by forming rough minute satin on the surface of the shutter curtain, the light incident on the shutter curtain is gently diffused on the surface of the shutter curtain. As a result, since the light gently diffused on the surface of the shutter curtain is incident on the internal illuminance meter 66, the illuminance of the light incident on the internal illuminance meter 62 can be measured exactly. Further, as for the photographing of the DSC 1, the refractive index of a central portion of the shutter curtain is made different from that of a peripheral portion thereof so that centralized exposure photographing becomes possible. Specifically, the reflecting quantity of the shutter curtain is adjusted by, for example, painting the shutter curtain in deeper color toward the peripheral portion so that the refractive index of the surface of the shutter curtain is reduced from the central portion of the shutter curtain toward the peripheral portion thereof. Further, the internal illuminance meter 62 is adjusted to output exact illuminance if the reflective index of the lens unit 2 in its optical path direction by the shutter curtain becomes about 18%.

In addition, in a construction which does not use a shutter curtain, the image sensor 72 can directly detect the illuminance of the light passed through the lens unit 2 or the internal illuminance meter 66 can indirectly detect the reflected light of a half mirror.

Figure 4:
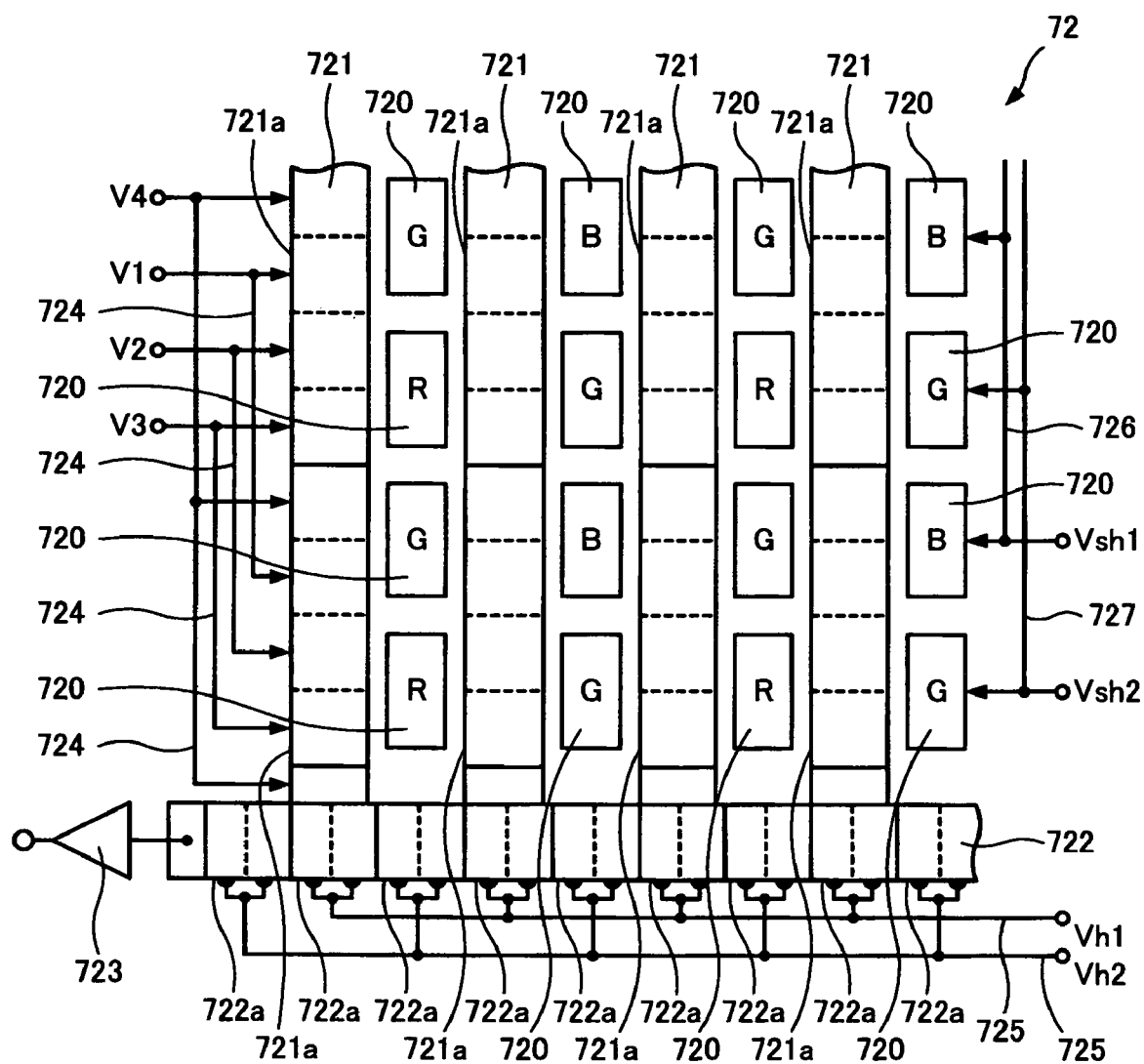
FIG. 4 is a schematic view of an image sensor related to the first embodiment.
Figure 5A:
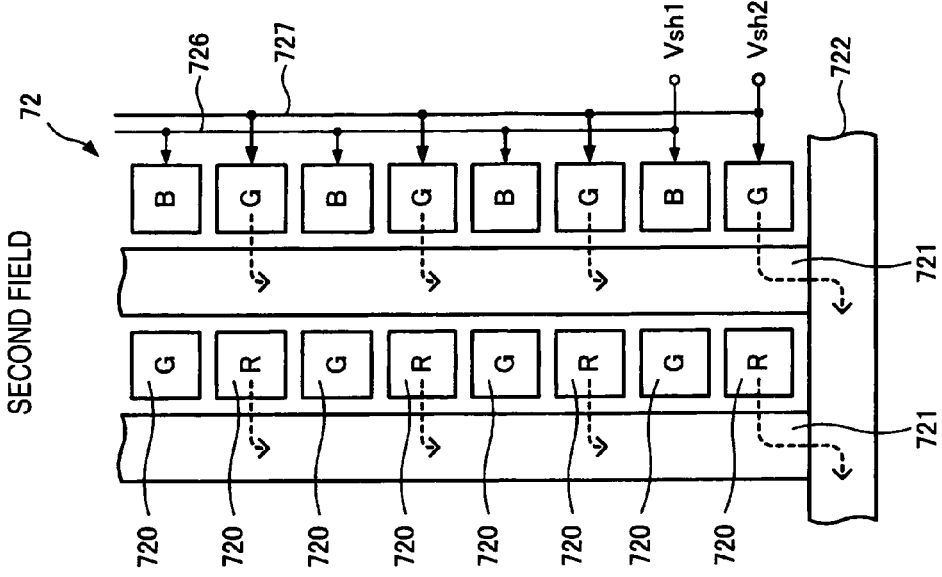
FIGS. 5A and 5B are schematic views for explaining a read method of the image sensor related to the first embodiment.
Figure 5B:
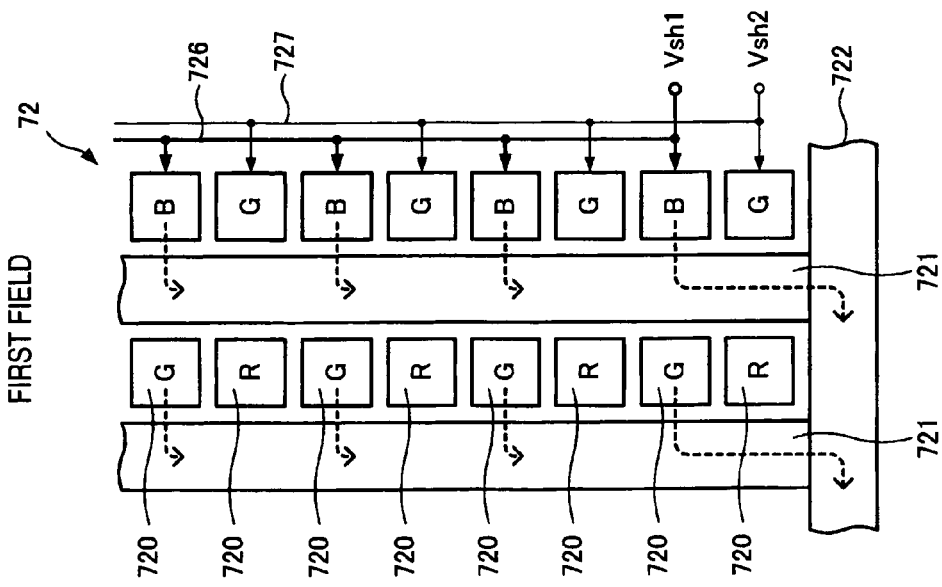

FIG. 4 is a schematic view of the image sensor 72. FIGS. 5A and 5B are schematic views for explaining a reading method of the image sensor 72.

The image sensor 72 is a so-called CCD color area image sensor composed of photodiodes 720, vertical CCDs 721, a horizontal CCD 722, a detecting element 723, etc., which are discretely arranged in a two-dimensional space. The image sensor 72 includes R, G, and B color filters which are Bayer-arrayed in every photodiode 720, and stores in each photodiode 720 a signal charge showing the density level of any one of RGB channels in every pixel. In addition, although the image sensor 72 in which the photodiodes 720 are arrayed in a tetragonal lattice are illustrated herein, the photodiodes 720 of the image sensor 72 may be arrayed in the shape of a honeycomb. Further, the color filters of the image sensors 72 may be arrayed in stripes. Further, the image sensor 72 may be a CMOS area image sensor.

Each vertical CCD 721 has four transfer electrodes which allow a vertical driving signal V1, V2, V3, or V4 to be input to every cell 721a. By gradually and sequentially applying vertical driving signals with mutually different phases to the four transfer electrodes, a potential well is formed in each cell 721a of the vertical CCD 721, and an electric charge bound in the potential well of each cell 721a moves to potential wells of sequentially adjacent cells 721a one after another. Signal charges transferred to each cell 721a from the photodiodes 720 in this way are transferred to the horizontal CCD 722. Hereinafter, the transfer of signal charges by the above-described vertical CCD 721 is referred to as "vertical CCD transfer."

The horizontal CCD 722 has two transfer electrodes which allow a horizontal driving signal Vh1 or Vh2 to be input to every cell 722a. Different potential wells are formed within the cells 722a of the horizontal CCD 722. In addition, by applying the horizontal driving signals Vh1 and Vh2 with different phases of 180° to the two horizontal transfer electrodes, a potential well is formed in every cell 722a, and an electric charge bound in the potential well of each cell 722a moves to potential wells of sequentially adjacent cells 722a one after another Signal charges transferred to each cell 722a by the vertical CCD 721 in this way are sequentially transferred to the detecting element 723. Specifically, vertical signal lines 724 and horizontal signal lines 725 are connected to transfer electrodes (not shown) of the vertical CCD 721 and the horizontal CCD 722, respectively. Also, the vertical CCD 721 and the horizontal CCD 722 are driven by the vertical driving signals (refer to V1 to V4 in FIG. 8) and the horizontal driving signals (refer to Vh1 and Vh2 in FIG. 8), respectively, which are applied to the above-mentioned signal lines by an image capturing controller 76, thereby transferring signal charges.

The detecting element 723 converts charges transferred to the horizontal CCD 722 into pixel signals. Specifically, for example, the detecting element 723, which is a floating diffusion amplifier, converts signal charges into voltages values as pixel signals according to its capacitance. In addition, although the image sensor 72 in which the vertical CCD 721 are of four-phase driving method is illustrated, the vertical CCD 721 may be a CCD of arbitrary phase driving method. Further, although the image sensor 72 in which the horizontal CCD 722 is of two-phase driving method is illustrated, the horizontal CCD 722 of the image sensor 72 may be a CCD of arbitrary phase driving method. Further, the detecting element 723 may be a floating gate amplifier.

As shown in FIGS. 5A and 5B, the image sensor 72 is an area image sensor of so-called frame reading method which reads pixel signals of one frame which are divided into two fields. Since a vertical CCD for reading in this area image sensor of frame reading method is used for both a first field and a second field, the area of the vertical CCD can be reduced. As a result, since the size of the photodiodes 720 can be increased or the size of the cells 721a (refer to FIG. 4) of the vertical COD 721 can be increased, it is advantageous in that the area image sensor of frame reading method can increase the saturated amount of signal charges. The image sensor 72 has a shift electrode for controlling transfer of signal charges from the photodiodes 720 to a vertical CCD 721 between the photodiodes 720 and the vertical CCD 721. A shift signal line 726 and a shift signal line 727 are connected to this shift electrode so that, during reading of each field, charge signals showing the density level of the same channels are transferred to a vertical CCD 721 in each column. Specifically, for example, in the image sensor 72 having Bayer-arrayed color filters, the shift signal line 726 and the shift signal line 727 are alternately connected to a continuous shift electrode. In this case, in the image sensor 72, a signal charge showing the density level of a G-channel or a B-channel is transferred to the vertical CCD 721 in each column from a photodiode 720 during reading of the first field (refer to FIG. 5A), and a signal charge showing the density level of an R-channel or a G-channel is transferred to a vertical CCD in each column from a photodiode during reading of the second field (refer to FIG. 5B).

As such, the image sensor 72 transfers signal charges of mutually different fields to the vertical CCD 721 in time-division manner to read pixel signals of one frame which is divided into two fields. In addition, although the image sensor 72 has been described as the one which reads pixel signals of one frame which is divided into two fields, it may be an area image sensor which reads pixel signals of one frame which are divided into three or more fields. Further, the image sensor 72 may be of full pixel reading method, if it has color filters which are arrayed in stripes.

It is noted herein that the image sensor 72 does not have a structure for a high-speed draft mode, for example, shift signal lines for selectively transferring signal charges from a plurality of photodiodes 720 which are arrayed along a vertical CCD 721. Therefore, in the image sensor 72, the size of the photodiodes 72 can be further increased, and the size of the vertical CCD 721 cab be increased. Thus, the saturated amount of signal charges can be increased. Further, since the area of light-receiving surfaces of the photodiodes 720 can be increased, this is advantageous from the viewpoint of sensitivity or the like. However, in the image sensor 72, by thinning out signal charges stored in the photodiodes 720 to transfer them to the vertical CCD 721 like a high-speed draft mode, the number of times of transfer of the signal charges required to display one frame by the horizontal CCD 722 cannot be reduced.

For example, if all pixels of an area image sensor of 600 million pixels (3008 pixels in the horizontal direction and 2000 pixels in the vertical direction) are read at a reading rate of 25 MHz by a related frame reading method, a reading time of 0.04 μs per one pixel is required. Therefore, the reading of one field requires a reading time of at least 120.32 ms (=0.04 μs×3008×1000). Accordingly, the reading of one frame requires a reading time of 240.64 ms when the reading time for at least two fields is added up. That is, if a continuous image is read and displayed using an area image sensor of 600 million pixels which does not correspond to the high-speed draft mode (hereinafter referred to as "through image reading"), only four frames can be read for one second. Here, the through image is a series of moving images which are obtained by photographing a photographic subject at predetermined time intervals. Moreover, this time is purely the time required to read all the pixels including 3008 pixels in the horizontal direction and 2000 pixels in the vertical direction.

Generally, since the time to read optical black pixels arranged around the image sensor 72, the processing time to drive the image sensor 72, the high-speed emission transfer time for noise emission, the exposure time of a photographic subject, and the like also are required, only two or three frames can be read practically, and thus the moving posture of a photographic subject cannot be practically read as a moving image.

Therefore, in the DSC 1, an image to be displayed as a moving image does not need to have high resolution. Even if it has low resolution, a reading method is schemed on the basis of the idea that higher frame rate brings a better result. First, after a fixed time of exposure, signal charges for pixels in the first field are shifted to a vertical CCD 721 by a shift signal. Thereafter, transfer of the individual signal charges in the vertical CCD 721 is carried out. At this time, analog accumulative addition of signal charges for a plurality of cells in the vertical direction is performed by storing signal charges for a plurality of cells of the vertical CCD 721 in each cell 722a of the horizontal CCD 722. In addition, the number of charges to be added up may be for two cells or for three cells. Then, the signal charges for a plurality of cells of the vertical CCD 721 are transferred by the horizontal CCD 721.

The number of reading lines of pixel lines in the vertical direction can be reduced by adding signal charges for a plurality of cells of the vertical CCD 721 as such (for example, if addition for two cells is performed, the number of reading lines become half, and if addition for four cells is performed, the number of reading lines becomes one fourth). Therefore, even if a structure for a high-speed draft mode is not provided, it is possible to reduce the number of transfer of signal charges by the horizontal CCD 722, which is required to display one frame of a through image as a moving image. At this time, for example, if addition for two cells and addition for four cells are performed, the number of times of transfer of signal charges can be reduced to half and one fourth, respectively, and the frame rate can be increased to twice and quadruple, respectively. Further, since the apparent sensitivity of the image sensor 72 can be raised by adding signal charges, the exposure period of the image sensor 72 during display of a through image can be shortened (for example, if addition for two cells are performed, the exposure period is shortened to half, and if addition for four cells is performed, the exposure period is shortened to one fourth). Accordingly, the frame rate can be further improved. As a result, the DSC 1 can display a through image at high speed even if an image sensor 72 with a large number of pixels, which is capable of photographing a high resolution of a still image. Further, the SN ratio of signal charges can also be improved by adding signal charges for a plurality of cells of the vertical CCD 721. In addition, the moving image may be a moving image which is recorded by a moving image photographing function of the DSC 1. Further, the number of signal charges to be added may be for two cells, for three cells, or for four cells, or may be changed automatically or manually. Hereinafter, "adding signal charges for 'n' cells of the vertical CCD 721 in each column to each of the cells 722a of the horizontal CCD 722" is referred to "n-time pixel addition."

The image capturing controller 76 shown in FIG. 3 applies vertical driving signals, horizontal driving signals, and shift signals to the transfer electrodes of the vertical CCD 721, the transfer electrodes of the horizontal CCD 722, and the shift electrode, respectively, via the vertical signal lines 724, the horizontal signal lines 725, and the shift signal lines 726 and 727, respectively.

An analog front end (AFE) 74 is composed of a correlation double sampling (CDS) circuit 740, an amplifier 742, an analog/digital (A/D) converter 744, an analog black level reproducing circuit (a circuit which reproduces a reference voltage of optical black by settling the signal level of black by using pixels, which are optically masked, in the image sensor 72) which is not shown, etc. The CDS circuit 740 is a circuit which removes reset noises concluded in pixel signals output by the image sensor 72. The amplifier 742 is an amplifier, i.e., a so-called variable gain amplifier to amplify pixel signals with gains corresponding to the brightness of a photographic subject. The A/D converter 744 generates digital pixel signals (hereinafter referred to as pixel data) by performing A/D conversion on pixel signals. The pixel data output from the AFE 74 is stored in a RAM 100 by an image processing controller 98.

The image processing controller 98 performs a variety of image processing on the image data output from the AFE 74, in cooperation with the RAM 100, a color processing part 102, a resolution converting part 104, and an image compression/extension part 106.

The RAM 100 is a volatile memory in which pixel data, etc. are temporarily stored.

The color processing part 102 cooperates with the image processing controller 98, and performs image development processing on the pixel data output from the AFE 74. The development processing is processing which generates frame data having density levels of three RGB channels in every pixel by means of white balance correction, gradation correction, and demosaic processing which interpolates the density level of each pixel of pixel data corresponding to a signal charge of each photodiode 720 on the image sensor 72 between neighboring pixels, and which finally reproduces the frame data in the form of an image.

The resolution converting part 104 cooperates with the image processing controller 98, and converts the resolution (total number of pixels) of frame data to a predetermined resolution. Specifically, for example, the resolution converting part 104 converts the resolution of frame data to a resolution corresponding to the photographing conditions set by a user before photographing, or converts the resolution of frame data to a resolution corresponding to the screen size of an LCD 36.

The compression/extension part 106 cooperates with the image processing controller 98, and compresses frame data and extends compressed frame data (for example, the compression/extension part compresses image data into image data of the JPEG format or extends data compressed into the JPEG format). In addition, the compression/extension part can also store frame data in the removable memory 92 without compressing the frame data.

A graphic controller 94 cooperates with the image processing controller 98, and displays an image represented by frame data on the screen of the LCD 36.

The above-described functions of the image processing controller 98, the color processing part 102, the resolution converting part 104, the compression/extension part 106, and the graphic controller 94 may be implemented by dedicated circuits, such ASIC and DSP, or may be implemented by execution of a specific program of a control section 80.

The operating part 84 has a power switch 52, a release button 10, a shutter speed dial 12, buttons 40, 42, 44, 46, 48 and 50 for setting photographing conditions, and a jog dial 22.

An external interface controller 86 communicably connects the DSC 1 with external systems, such as a personal computer (PC) (not shown). A removable memory controller 88 is an input/output mechanism which transfers the data stored in the RAM 100 to the removable memory 92 as a recording medium connected to a card connector 90. In addition, the recording medium may be built-in memories, such as a flash memory 82.

The flash memory 82 is a volatile memory which stores image processing programs to be executed by the control section 80. Image processing programs and various kinds of data which are necessary for operation of the DSC 1 can also be stored in the flash memory 82 by downloading over networks from a predetermined server, reading from the removable memory 92, or the like.

The control section 80 has a CPU 78, a RAM 81, and a flash memory 82. The control section 80 executes the control programs stored in the flash memory 82 to control respective parts of the DSC 1, and also functions as a display control unit and a still image recording unit. The RAM 81 is a volatile memory is which temporarily stores control programs and various kinds of data.

Figure 6:
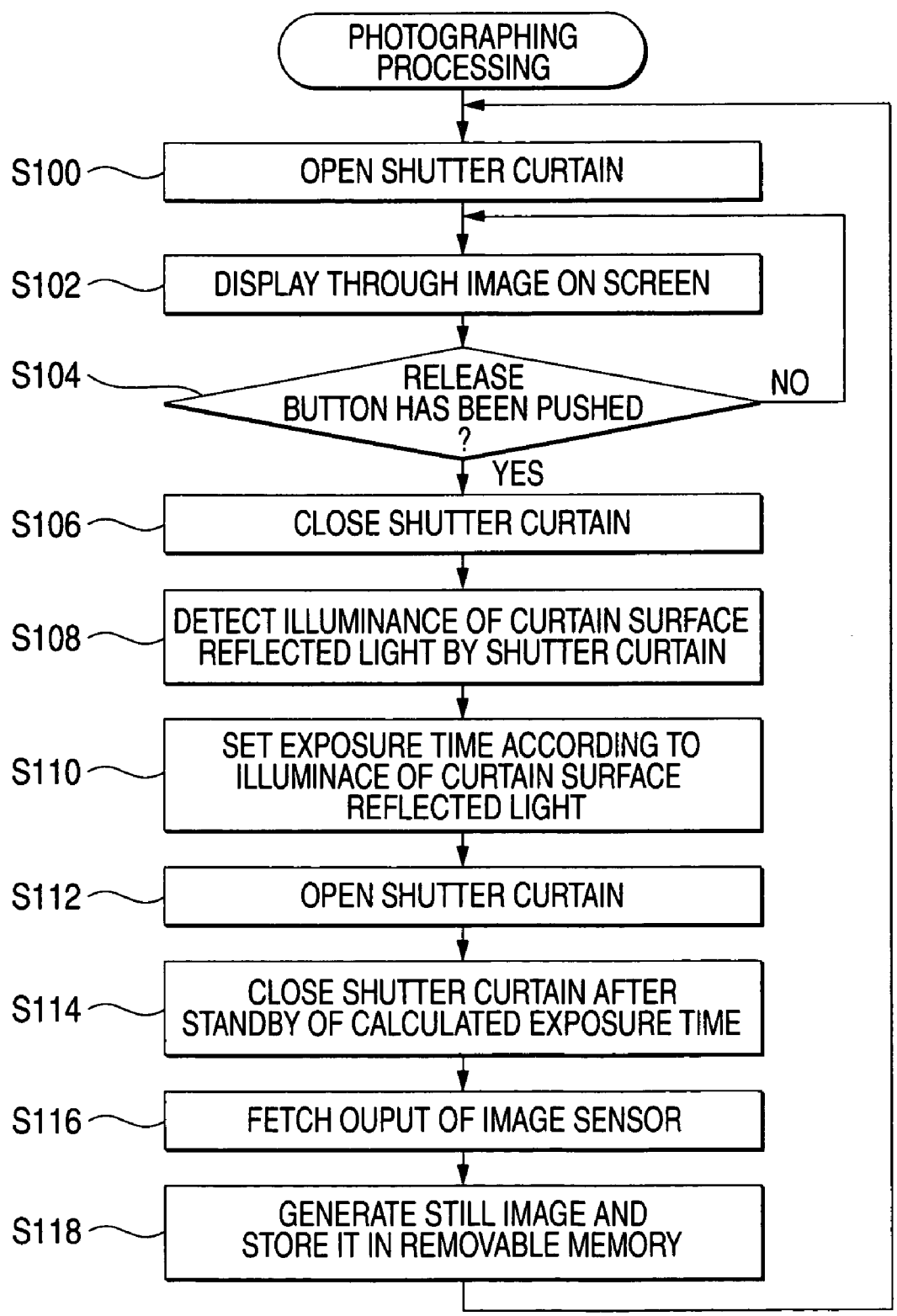
FIG. 6 is a flowchart showing the flow of processing in a photographing mode related to the first embodiment.

FIG. 6 is a flowchart showing the flow of processing in a through image photographing mode of the DSC 1. The processing shown in FIG. 6 is started when the DSC 1 transits to the through image photographing mode, and the processing is repeated until the DSC 1 transits from the through image photographing mode to any mode other than the through image photographing mode.

First, the control section 80 opens the first shutter curtain 30 and the second shutter curtain 32 in cooperation with the shutter driving part 70 (refer to Step S100). Hereinafter, the expression "open the first shutter curtain 30 and the second shutter curtain 32" is referred to as "open the shutter curtain."

In Step S102, the control section 80 displays a through image on the screen of the LCD 36. Specifically, the control section 80 makes signal charges stored in the photodiodes 720 for a predetermined period of exposure using an electronic shutter with the shutter curtain opened, and reads pixel signals according to these signal charges from the image sensor 72. Then, the control section 80 generates frame data from the read pixel signals, and performs pixel interpolation procession for each of R, G and B, white balancing processing, color reproduction processing, gamma correction processing, and vertical-and-horizontal-size reducing processing, etc. on this frame data, thereby displaying an image for one frame represented by the frame data after the various kinds of processing. The control section 80 repeats the series of processing to display a through image as a moving image on the LCD 36. The detailed description thereof will be made below.

In Step S104, the control section 80 determines whether or not the release button 10 has been pushed. If the release button 10 is pushed, the control section 80 executes processing (refer to Step S106 to Step S118) for photographing a still image of a photographic subject.

In Step S106, the control section 80 closes the first shutter curtain 30 and the second shutter curtain 32 in cooperation with the shutter driving part 70 (hereinafter referred to as "close the shutter curtain"), and then performs charge of the shutter for the next shutter operation, preparation of the image sensor 72 for the next photographing, etc.

In Step S108, the control section 80 detects the illuminance of curtain surface reflected light reflected by the first shutter curtain 30 or the second shutter curtain 32. Specifically, the control section 80 reads output signals of the internal illuminance meter 66, thereby detecting the illuminance of the light which is transmitted through the diaphragm 62 of the lens unit 2 and reflected by the shutter curtain.

In Step S110, the control section 80 sets an optimal exposure period (a proper period in which the shutter curtain is to be opened) under photographing conditions according to the illuminance of the curtain surface reflected light. Specifically, the control section 80 sets an exposure period on the basis of output signals of the internal illuminance meter 66.

In Step S112 to Step S114, the control section 80 opens the shutter curtain only for the exposure period set in Step S110. Specifically, the control section 80 performs preparation for exposure of the image sensor 72 prior to the opening of the shutter curtain (for example, emission processing of charges stored in the individual photodiodes 720 of the image sensor 72 and emission processing of charges remaining in the vertical CCDs 721 and the horizontal CCD 722). Then, if preparation for the exposure of the image sensor 72 is made, the control section 70 opens the shutter curtain in cooperation with the shutter driving part 70 (refer to Step S112), and closes the shutter curtain after the set exposure period has elapsed from when the shutter curtain has been opened (refer to Step S114). As a result, the image sensor 72 is exposed to the light from a photographic subject only for the exposure period.

In Step S116 to Step S118, the control section 80 generates a still image. Specifically, the control section 80 makes the charges remaining in the vertical CCDs 721 and the horizontal CCD 722 of the image sensor 72 emitted, and thereafter reads pixel signals of a first field and pixel signals of a second field sequentially from the image sensor 72 (refer to Step S116). Then, the control section 80 performs development processing on the read pixel signals of the first field and the read pixel signals of the second field in cooperation with the color processing part 102, thereby generating frame data from the pixel signals of the first field and the pixel signals of the second field. Moreover, the control section 80 performs resolution conversion processing, compression processing (for example, compressing processing according to the JPEG standard), and the like on the frame data, in cooperation with the resolution conversion part 104, the compression/extension part 106, the image processing controller 98, and the removable memory controller 88, and stores the frame data in the removable memory 92, etc. (refer to Step S118) as a still image (for example, a still image of the JPEG format).

FIGS. 7A to 7D are schematic views showing the operation of the image sensor 72 in the through image display processing. FIG. 8 is a schematic view showing driving signals output by the image capturing controller 76 in the through image display processing. FIGS. 7A to 7D respectively show states of the image sensor 72 at t1 to t4 of FIG. 8. FIG. 9 is a schematic view showing the processing which generates frame data from pixel signals in the through image display processing. Hereinafter, the through image processing will be described while the processing which reads pixel signals of a first field from the image sensor 72, and generates frame data for one frame from the read pixel data of the first field, and its previously read pixel signals of the second field is specifically described.

Figure 7A:
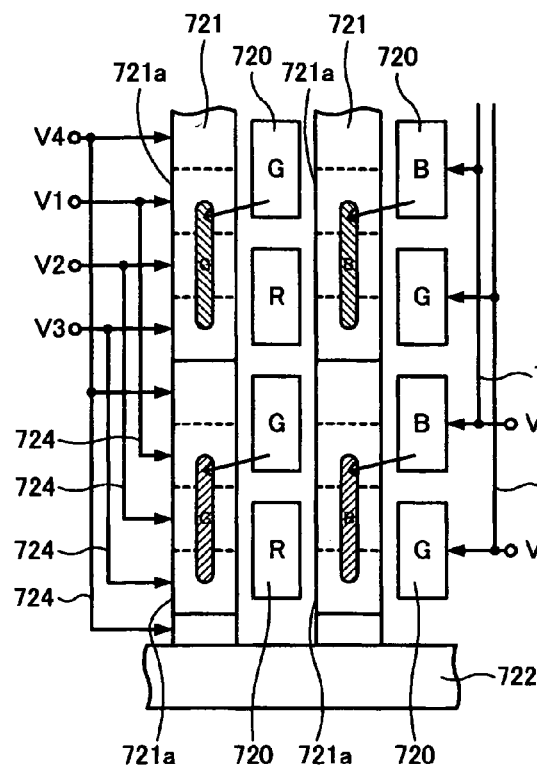
FIGS. 7A to 7D are schematic views showing the operation of the image sensor related to the first embodiment
Figure 8:
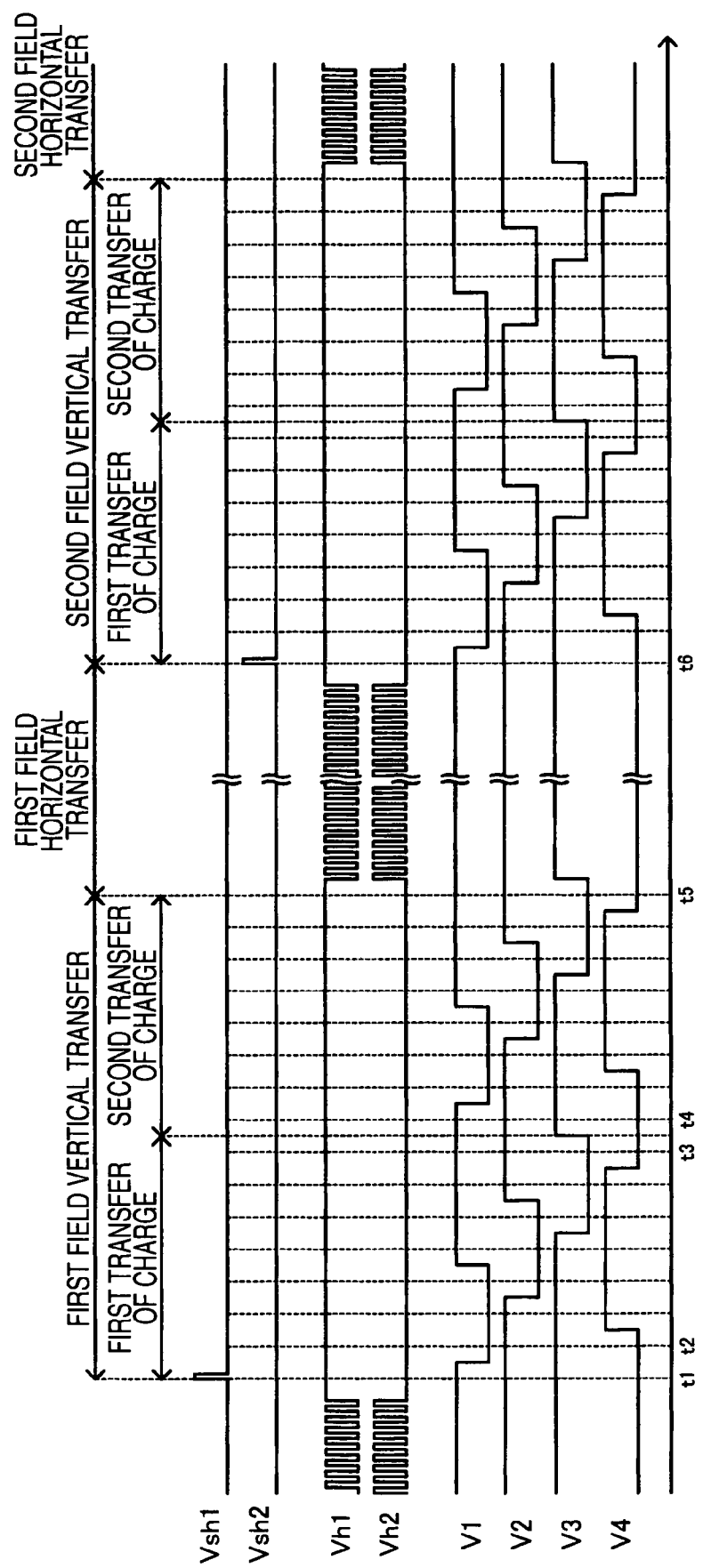
FIG. 8 is a schematic view showing driving signals of the image sensor related to the first embodiment.
Figure 9:
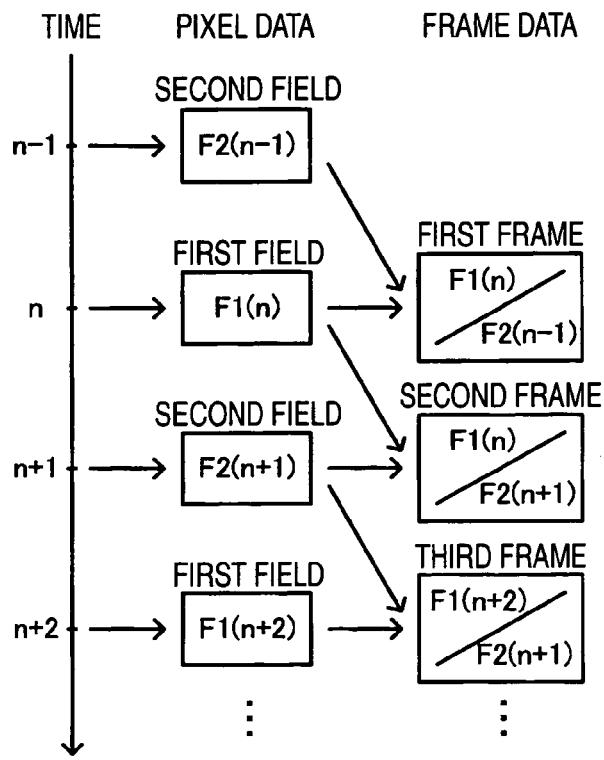
FIG. 9 is a schematic view for explaining the processing which generates frame data from pixel signals.

First, the control section 80 transfers signal charges of a first field to the individual cells 721a of the vertical CCD 721 from the photodiodes 720 (refer to waveforms of Vsh at t1 shown in FIG. 7A and FIG. 8). At this time signal charges showing the density level of the same channels, specifically, signal charges showing the density level of G channels, or signal charges showing the density level of B channels are transferred to all the cells 721a of the vertical CCD 721 in each column from the corresponding photodiodes 721.

Figure 7B:
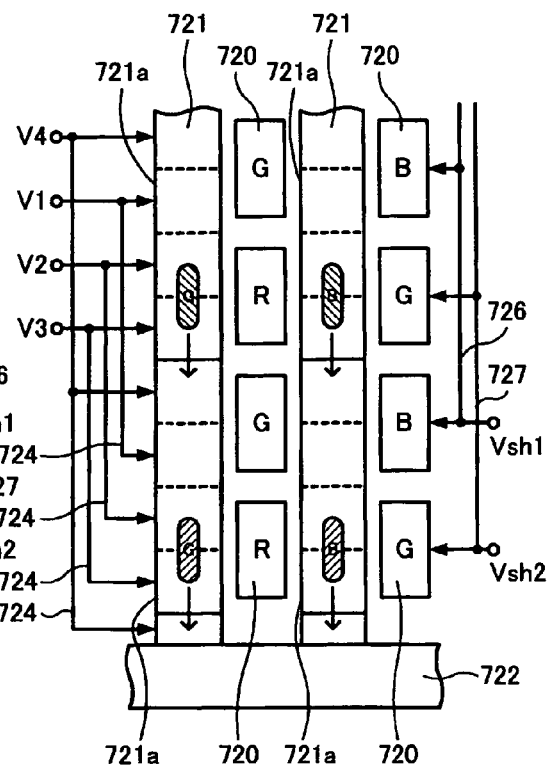
Figure 7C:
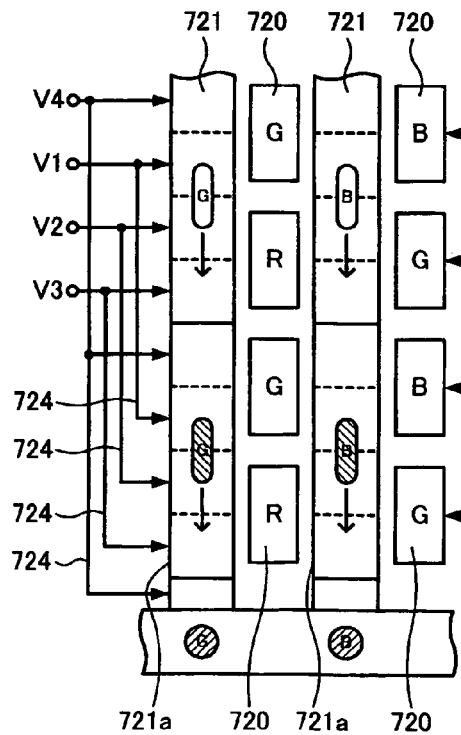
Figure 7D:
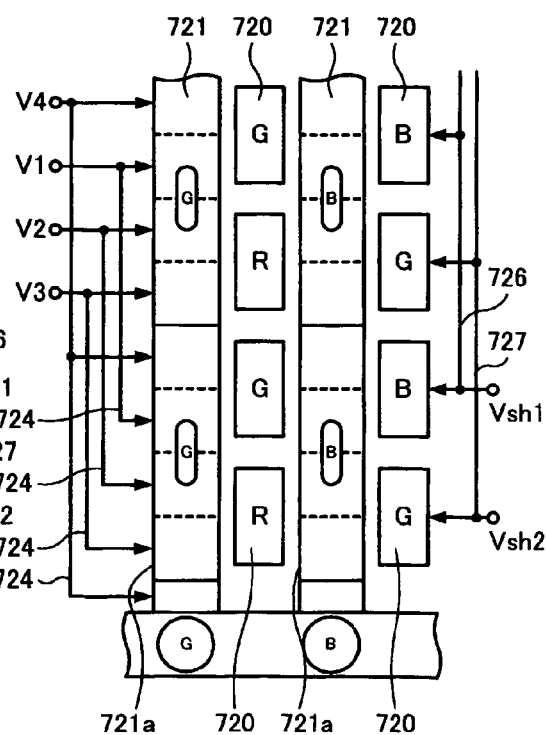

Next, the control section 80 adds up signal charges for a plurality of cells of the vertical CCD 721 in each column, in each cell 722a of the horizontal CCD 722. Specifically, for example, when signal charges for two cells of the vertical CCD 721 in each column are added up, the control section 80 makes the vertical CCD 721 transfer signal charges for two cells of the vertical CCD 721 to each cell 722a of the horizontal CCD 722, without driving the horizontal CCD 722 (refer to waveforms of Vh at t1 to t5 shown in FIG. 8). Waveforms V1 to V4 at t1 to t3 shown in FIGS. 7B and 7C and FIG. 8 show vertical driving signals for transferring a signal charge in the first cell, and Waveforms V1 to V4 at t4 to t5 shown in FIG. 7D and FIG. 8 show vertical driving signals for transferring a signal charge in the second cell. As a result, signal charges for two cells of the vertical CCD 721 in each column are stored in each cell 722a of the horizontal CCD 722. In addition, signal charges showing the density level of the same channels are transferred to the vertical CCD 721 in each column as described above, signal charges showing the density level of different channels are not mixed in each cell 722a of the horizontal CCD 722 by the pixel addition. However, even if signal charges showing the density level of mutually different channels are mixed in the pixel addition, generation of a monotone through image is possible. Therefore, signal charges showing the density level of different channels may be transferred to the vertical CCD 721 in each column. However, even if signal charges showing the density level of mutually different channels are mixed in the pixel addition, for example, a monotone through image is displayed, signal charges showing the density level of different channels may be transferred to the vertical CCD 721 in each column.

Next, the control section 80 makes the horizontal CCD 722 transfer the signal charges after the pixel addition to the detecting element 723 (refer to waveforms of Vh at t5 to t6 shown in FIG. 8), and makes the detecting element 723 convert the signal charges into pixel signals. That is, the horizontal CCD 722 clears off charges only once whenever charges for two cells of a vertical CCD are stored in each cell. In the DSC 1, the number of times of transfer of signal charges of the horizontal CCD 722 can be reduced in this manner, thereby reducing the number of times of transfer of signal charges by the vertical CCD 721, which is required for displaying one frame. Specifically, the number of times of transfer by the vertical CCD 721, which is required for displaying one frame is reduced to one n-th by n-time pixel addition. As a result, pixel signals required for displaying one frame can be output at high speed from the image sensor 72. In addition, when the detecting element 723 is a floating diffusion amplifier, the control section 80 may transfer signal charges for a plurality of cells of the vertical CCD 722 to the detecting element 723, thereby making the detecting element 723 convert signal charges into pixel signals after addition of the signal charges by the detecting element 723.

Noise removal by the AFE 74, brightness adjustment, A/D conversion, etc. are performed on the pixel signals read from the image sensor 72. Specifically, the brightness adjustment is performed when the control section 80 controls the gain of the amplifier 742 according to the brightness of a photographic subject. The control section 80 determines the brightness of a photographic subject, for example, from a pixel signal read before a pixel signal to be adjusted. In addition, the adjustment of the brightness of a through image may be performed by setting a multiple for pixel addition in every field or in every frame according to the brightness of a photographic subject, with the exposure period being kept constant. When the above-described adjustment of the brightness by the amplifier 724 and the above-described adjustment of the brightness by the pixel addition are utilized together, pixel signals subjected to the pixel addition show that a photographic subject is brighter than the actual brightness of the photographic subject. Therefore, determination of the brightness of a photographic subject based on pixel signals requires consideration of a multiple for pixel addition.

Next, the control section 80 stores pixel data output from the AFE 74 in the RAM 100 in cooperation with the image processing controller 98. It is noted herein that the vertical resolution of a frame represented by the pixel data output from the AFE 74 is reduced in the vertical direction by addition of signal charges. Therefore, the control section 80 thins out pixels of the image data in the horizontal direction or adds up pixel values, which are continuous in the horizontal direction, according to the number of addition of the signal charges in the vertical direction, thereby reducing the vertical resolution of a frame represented by the pixel data output from the AFE 74. As a result, distortion of a frame represented by the pixel data output from the AFE 74 is corrected, and the resolution of the frame is reduced. By reducing the amount of information of the pixel data as such, the amount of processing to be performed on the image data afterwards can be reduced.

Next, the control section 80 generates frame data for one frame from previously read pixel data of a second field and currently read pixel data (refer to FIG. 9) in cooperation with the color processing part 102. Then, the control section 80 makes a frame represented by the frame data, which has been converted into frame data with a resolution corresponding to the screen size of the LCD 36, displayed on the LCD 16 in cooperation with the resolution converting part 104, the image processing controller 98 and the graphic controller 94. Meanwhile, the currently read pixel data is used for generation of the next frame data, along with pixel data to be read next time, as shown in FIG. 9. That is, in the DSC 1, a through image is displayed on the LCD 36 while the pixel data read from the image sensor 72 is used for generation of frame data for two continuous frames. In addition, generation of the pixel data of the field and generation of the frame data are performed in the same period.

Figure 10:
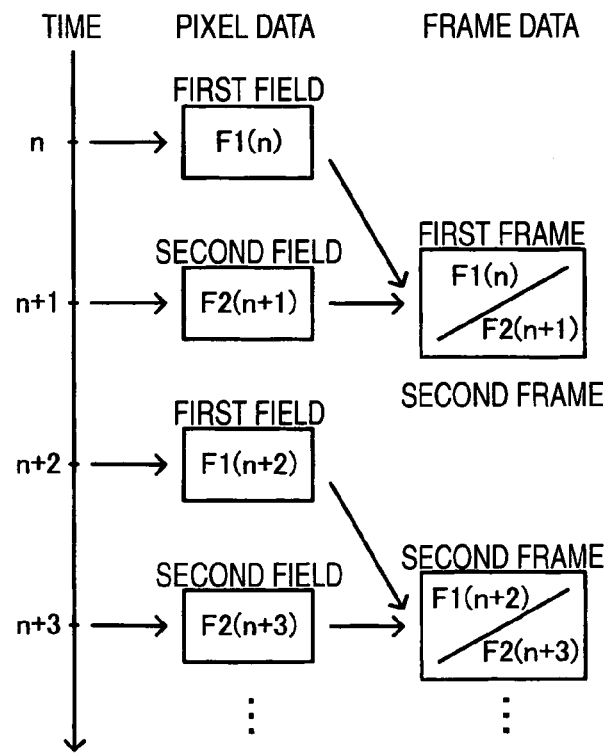
FIG. 10 is a schematic view for explaining the processing which generates frame data from pixel signals.

By using the pixel data read from the image sensor 72 for the generation of frame data for two continuous frames, the frame rate can be increased as compared with a case (refer to FIG. 10 in which the pixel data is used for generation of frame data for one frame. In addition, when the image sensor 72 is an image sensor which reads pixel signals of one frame which is divided into a plurality of (three or more) fields, the pixel data read from the image sensor 72 may be used for generation of frame data for a plurality of continuous frames according to the number of the divided fields. Further, the DSC 1 may be controlled so as to be able to be switched between a frame generating mode shown in FIG. 9 and a frame generating mode shown in FIG. 10.

Furthermore, the DSC 1 may read the first field and the second field alternately, and generate one frame of a monotone through image from image signals for one field whenever it reads one field. The frame of a monotone through image as a monotone moving image can be generated on the basis of signal charges showing the density level of some channels among all the channels. For example, the frame of a monotone through image can be generated on the basis of signal charges showing the density level of a G channel of RGB channels. Therefore, the frame of a continuous monotone through image can be generated from image signals of a first field and image signals of a second field, which are continuous, on the basis of image signals of G channels commonly included in the first field and the second field. Here, the image signals of G channels means image signals correlated to the signal charges showing the density level of the G channels. As a result, since the number of times of reading of fields required for generating one frame can be reduced, even if a structure for a high-speed draft mode is not provided, the frame rate of a through image can be increased. In addition, the DSC 1 may read either a first field or a second field continuously, and may not need to read the other field at all during display of a monotone through image. In this case, the DSC 1 generates one frame of a monotone through image from image signals for one field whenever it reads either the first field or the second field.

Figure 11:
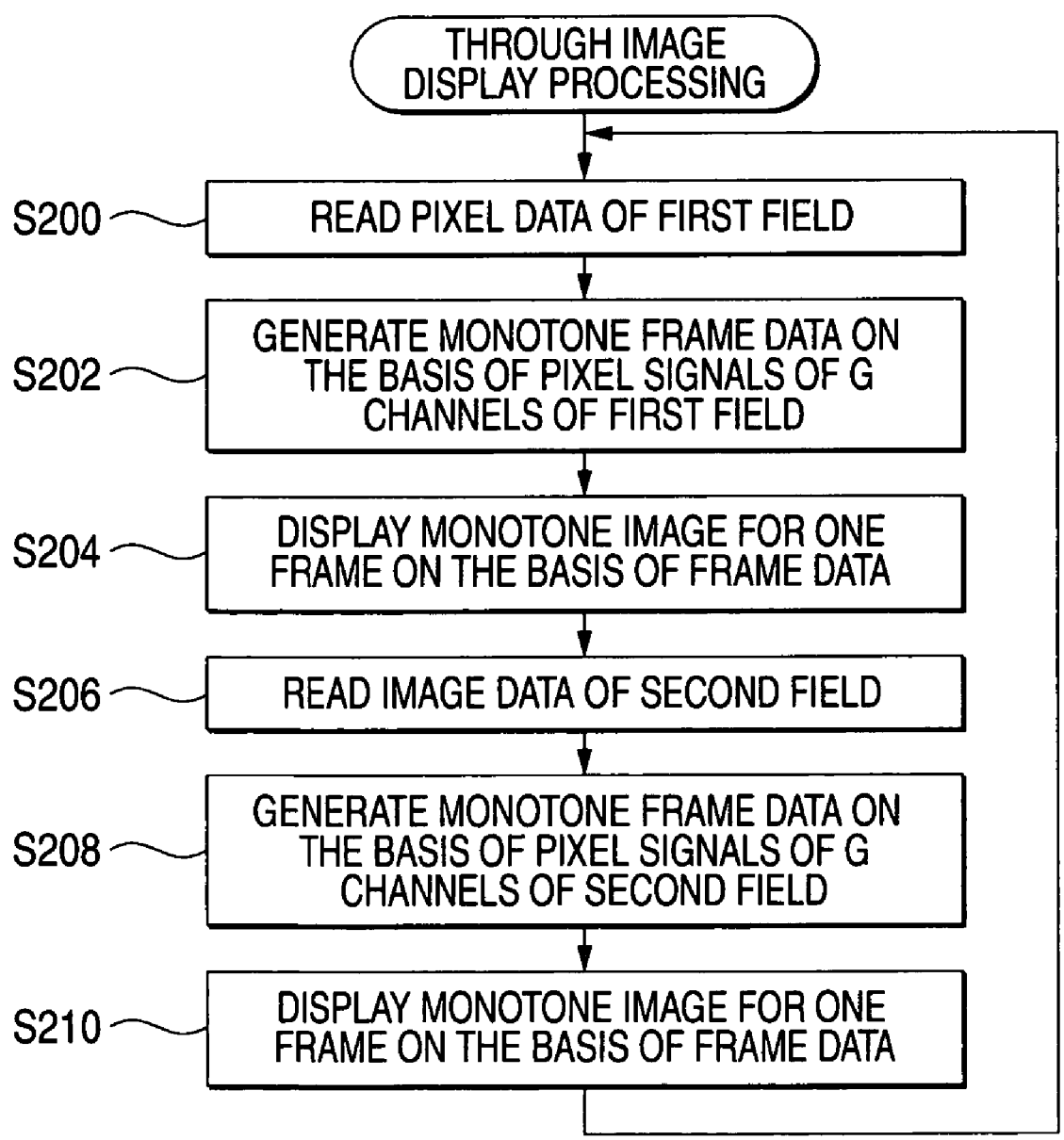
FIG. 11 is a flowchart showing the operation of the image sensor in the through image display processing.

FIG. 11 is a flowchart showing the through image display processing which displays a monotone through image.

First, the control section 80 reads pixel signals of a first field (refer to Step S200). If pixel signals of a first field have been read, the control section 80 executes the processing of Step S202.

In Step S202, the control section 80 generates monotone frame data on the basis of only pixel data of G channels of a first field. Specifically, for example, the control section 80 generates monotone frame data for one field on the basis of only read pixel data of G channels in cooperation with the color processing part 102. Since the frame data is generated on the basis of only pixel signals of a first field, the number of times of field reading required for generating frame data for one field can be reduced as compared with a case in which the frame data is generated on the basis of pixel signals of a plurality of fields. Further, since the frame data is generated on the basis of only the pixel data of G channels, the processing amount of the pixel data required for generating the frame data for one field can be reduced as compared with a case in which the frame data is generated on the basis of the pixel data of G channels and pixel data of B channels. As a result, the frame rate of a through image can be increased. In addition, the monotone frame data may be generated on the basis of the pixel data of G channels of a first field and pixel data of B channels of a first field.

In Step S204, the control section 80 displays a monotone image for one field on the LCD 36 on the basis of the frame data. Specifically, for example, the control section 80 displays a frame represented by the frame data converted to have a resolution corresponding to the screen size of the LCD 36, in cooperation with the resolution converting part 104, the image processing controller 98 and the graphic controller 94.

In Step S206, the control section 80 reads pixel signals of a second field similarly to the processing of Step S200.

In Step S208, the control section 80 generates frame data on the basis of the read pixel signals of G channels of the second field, similarly to the processing of Step S202.

In Step S210, the control section 80 displays on the LCD 360 the monotone frame generated on the basis of the pixel signals of G channels of the second field, similarly to the processing of Step S204.

By repeating the above-described processing of Step S200 to Step S210, the control section 80 displays a predetermined number of continuous frames of a monotone through image on the LCD 36.

In addition, generation of the pixel data of the field and generation of the frame data are performed in the same period.

Further, the DSC 1 may display continuous monotone frames on the LCD 36 on the basis of pixel signals of G channels of a first field, which have been read continuously by repeating the processing of Step S200 to Step S204. Besides, the DSC 1 may display continuous monotone frames on the LCD 36 on the basis of pixel signals of G channels of a second field, which have been read continuously by repeating the processing of Step S206 to Step S210. By reading pixel signals of either the first field or the second field, a time difference in exposure period between continuous fields can be shortened, and signal charges can be read from the same photodiode 721 between the continuous fields. As a result, a high-definition, clear through image can be displayed on the LCD 36 as compared with a through image based on the pixel signals of both of first and second fields.

Second Embodiment

Figure 12:
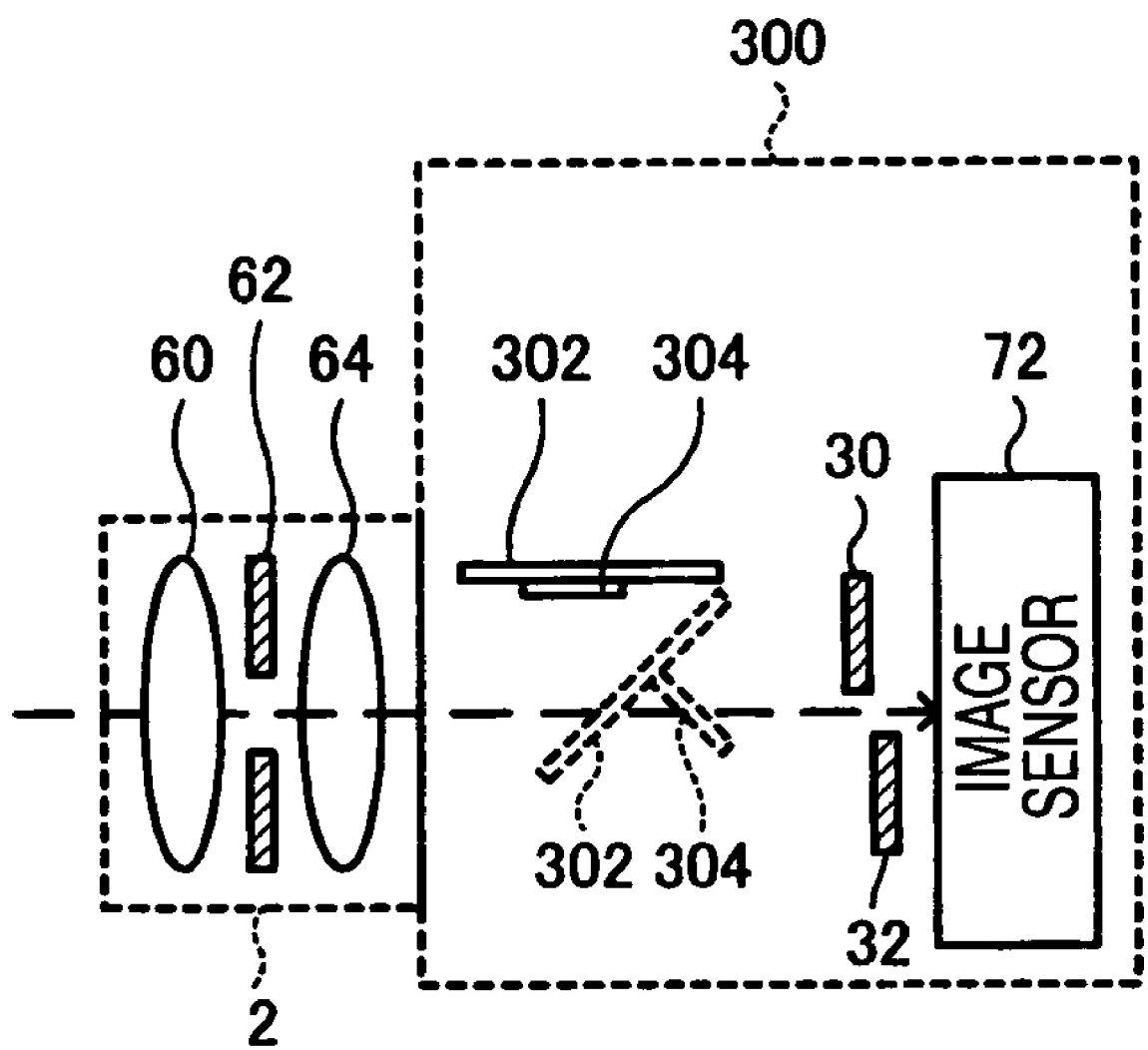
FIG. 12 is a schematic view of a digital still camera according to a second embodiment.

FIG. 12 is a schematic view of a DSC 300 according to a second embodiment.

The DSC 300 is a so-called single lens reflex DSC including a main mirror 302 and a sub-mirror 304. A central portion of the main mirror 302 is composed of a half mirror. The sub-mirror 304 is disposed in the vicinity of the center of the main mirror 302 to reflect the light transmitted through the half mirror. Hereinafter, the central portion of the main mirror 302 is referred to as a half mirror part. The DSC 300 includes the substantially same components as those of the DSC 1 according to the first embodiment shown in FIG. 3.

When the main mirror 302 and the sub-mirror 304 takes a posture indicated by a dotted line in shown FIG. 12 (hereinafter referred to as "mirror-down state"), the light from a photographic subject which has been transmitted through lenses 60 and 64 and incident on a portion other than the mirror half part of the main mirror 302 is reflected by the main mirror 302. On the other hand, the light which has been transmitted through the lenses 60 and 64 and incident on the half mirror part of the main mirror 302 is split into light which is reflected by the surface of the main mirror and light which is transmitted through the half mirror part. The beam reflected by the main mirror 302 is guided to an eyepiece lens by a pentaprism (not shown) which is disposed above the camera. In contrast, the light from a photographic subject which has been transmitted through the half mirror part of the main mirror 302 is guided from the main mirror 302 to an AF sensor module (not shown), which is disposed below the camera, by a portion of the sub-mirror 304 located on the side of the image sensor 72.

When the image sensor 302 takes a posture indicated by a solid line in FIG. 12 (hereinafter referred to as "mirror-up state"), the sub-mirror 304 is folded until it takes a posture parallel to the main mirror 302 so as to approach the main mirror 302. In the mirror-up state, the light from a photographic subject is guided in the direction of the shutter curtains 30 and 32, and incident on the image sensor 72 when the shutter is opened.

Figure 13:
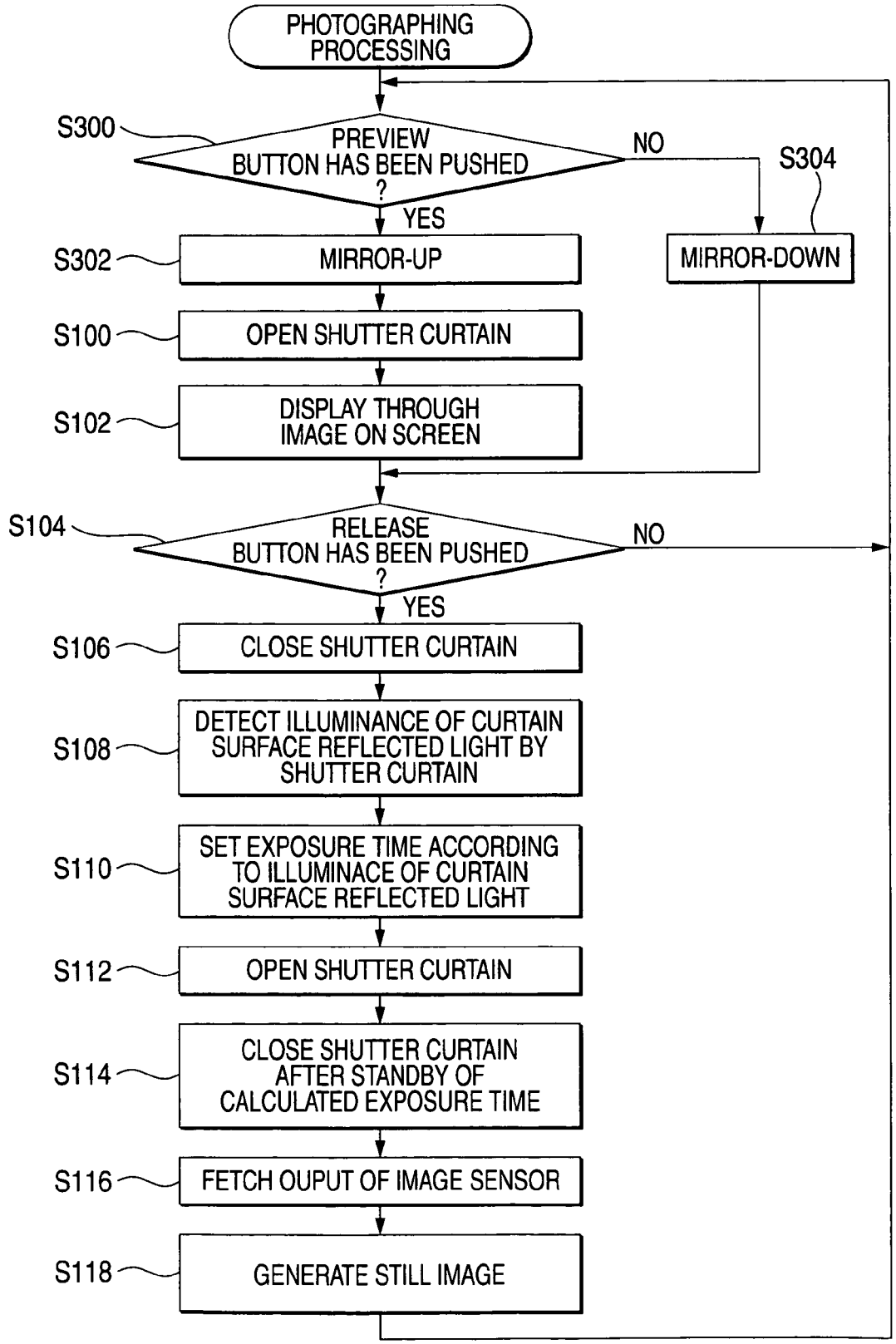
FIG. 13 is a flowchart showing the flow of processing in a photographing mode related to the second embodiment.

FIG. 13 is a flowchart showing the flow of processing in a photographing mode of the DSC 300. The processing shown in FIG. 13 is started when the DSC 300 transits to the photographing mode and is repeated until the USC 300 transits from the photographing mode to any mode other than the photographing mode.

First, the control section 80 determines whether or not a preview button is pushed (refer to Step S300). Here, the preview button is an actuator which allows selection of either a mode in which a subject is photographed while being checked with a through image as a moving image being displayed on the LCD 36 or a mode in which a subject is photographed while being checked with an optical finder.

When the preview button is pushed, the control section 80 controls the main mirror 302 and the sub-mirror 304 so that they may take the mirror-up state (refer to Step S302). Then, the control section 80 executes the substantially same processing as that in Step S100 and S118. As a result, a photographer can photograph a subject while checking it with a through image as a moving image displayed on the LCD 36.

On the other hand, when the preview button is not pushed, the control section 80 controls the main mirror 302 and the sub-mirror 304 so that they may take the mirror-down state (refer to Step S304). Then, since the light from a photographic subject is guided to an eyepiece lens as described above, a photographer can check the photographic subject with an optical finder. Then, the control section 80 executes processing in Step S104.

What is claimed is:

1. A control method of a digital camera, the control method comprising:
    displaying a moving image on a screen based on charges stored in an image sensor by an electronic shutter with a shutter curtain opened;
    determining whether a switch operation is performed, while displaying the moving image with the shutter curtain opened;
    closing the shutter curtain in response to the switch operation upon determining that the switch operation is performed;
    detecting illuminance of the shutter curtain with the shutter curtain closed to set a still image exposure period based on the detected illuminance of the shutter curtain, in response to the switch operation;
    opening the shutter curtain, after the still image exposure period is set;
    exposing the image sensor in the still image exposure period with the shutter curtain opened; and
    storing a still image in a recording medium based on the charges stored in the image sensor in the still image exposure period.

2. The control method according to claim 1, wherein the displaying process includes:
    storing the charges in photodiodes of the image sensor;
    transferring the charges, which belong to a plurality of fields being different from each other and constituting one frame, from the photodiodes to a vertical element of the image sensor in time-division manner;
    transferring the charges in every field from the vertical element to a horizontal element of the image sensor;
    transferring the charges in every field from the horizontal element to a detecting element of the image sensor;
    generating pixel signals corresponding to the charges transferred to the detecting element in every field; and
    generating a plurality of continuous frames based on each pixel signal while displaying each frame as the moving image.

3. The control method according to claim 2, wherein the charges in a plurality of cells of the vertical element are transferred to and accumulated in each of cells of the horizontal element.

4. The control method according to claim 1, wherein the displaying process includes:
    storing the charges in photodiodes of the image sensor;
    transferring the charges, which belong to a plurality of fields being different from each other and constituting one frame, from the photodiodes to a vertical element of the image sensor in time-division manner;
    transferring the charges in every field from the vertical element to a horizontal element of the image sensor;
    transferring the charges in every field from the horizontal element to a detecting element of the image sensor;
    generating pixel signals corresponding to the charges transferred to the detecting element in every field; and
    generating each frame based on each pixel signal while displaying each frame as the moving image.

5. The control method according to claim 4, wherein
the charges in a plurality of cells of the vertical element are transferred to and accumulated in each of cells of the horizontal element.

6. The control method according to claim 1, wherein
a surface of the shutter curtain is painted.

7. The control method according to claim 1, wherein
a surface of the shutter curtain is formed such that a light incident on the surface is diffused.

8. The control method according to claim 1, further comprising:
closing the shutter curtain after exposing the image sensor in the still image exposure period with the cutter curtain opened, in response to the switch operating; and
generating the still image after closing the shutter curtain.

9. The control method according to claim 8, further comprising:
opening the shutter curtain and displaying the moving image, in response to the generation of the still image.

10. The control method according to claim 7, wherein the surface of the shutter curtain is formed by a rough minute satin.

11. A digital camera comprising:
an image sensor;
a shutter curtain, adapted to expose and shield the image sensor;
a shutter driver operable to control the shutter curtain;
a display controller, operable to display a moving image on a screen based on charges stored in the image sensor by an electronic shutter with the shutter curtain opened;
a control section, operable to determine whether a switch operation is performed, while the display controller displays the moving image with the shutter curtain opened; and
a still image recorder, operable:
to detect illuminance of the shutter curtain with the shutter curtain closed to set a still image exposure period based on the illuminance,
to expose the image sensor in the still image exposure period with the shutter curtain opened, and
to store a still image in a recording medium based on the charges stored in the image sensor in the still image exposure period,
wherein:
the shutter driver closes the shutter curtain in response to the switch operation, when the control section determines that the switch operation is performed,
the still image recorder detects the illuminance of the shutter curtain with the shutter curtain closed to set the still image exposure period in response to the switch operation, and
the shutter driver opens the shutter curtain after the still image exposure period is set.

12. The digital camera according to claim 11, wherein
the image sensor includes a first controller, operable:
to store the charges in photodiodes of the image sensor;
to transfer the charges, which belong to a plurality of fields being different from each other and constituting one frame, from the photodiodes to a vertical element of the image sensor in time-division manner;
to transfer the charges in every field from the vertical element to a horizontal element of the image sensor; and
to transfer the charges in every field from the horizontal element to a detecting element of the image sensor, and
the display controller includes a second controller, operable:
to generate pixel signals corresponding to the charges transferred to the detecting element in every field;
to generate a plurality of continuous frames based on each pixel signal; and
to display each frame as the moving image.

13. The digital camera according to claim 12, wherein
the charges in a plurality of cells of the vertical element are transferred to and accumulated in each of cells of the horizontal element.

14. The digital camera according to claim 11, wherein:
the image sensor includes a first controller, operable:
to store the charges in photodiodes of the image sensor;
to transfer the charges, which belong to a plurality of fields being different from each other and constituting one frame, from the photodiodes to a vertical element of the image sensor in time-division manner;
to transfer the charges in every field from the vertical element to a horizontal element of the image sensor; and
to transfer the charges in every field from the horizontal element to a detecting element of the image sensor, and
the display controller includes a second controller, operable:
to generate pixel signals corresponding to the charges transferred to the detecting element in every field;
to generate each frame based on each pixel signal; and
to display each frame as the moving image.

15. The digital camera according to claim 14, wherein
the charges in a plurality of cells of the vertical element are transferred to and accumulated in each of cells of the horizontal element.

16. The digital camera according to claim 11, wherein
a surface of the shutter curtain is painted.

17. The digital camera according to claim 11, wherein
a surface of the shutter curtain is formed such that a light incident on the surface is diffused.

18. The digital camera according to claim 11, wherein:
the shutter driver closes the shutter curtain after the still image recorder exposes the image sensor in the still image exposure period with the shutter curtain opened, in response to the switch operation; and
the still image recorder generates the still image after the shutter driver closes the shutter curtain.

19. The digital camera according to claim 18, wherein:
the shutter driver opens the shutter curtain and the display controller displays the moving image, in response to the generation of the still image by the still image recorder.

20. The digital camera according to claim 17, wherein the surface of the shutter curtain is formed by a rough minute satin.

* * * * *